US007775035B2

(12) United States Patent
Veigel et al.

(10) Patent No.: US 7,775,035 B2
(45) Date of Patent: Aug. 17, 2010

(54) PROCEDURE TO OPERATE A METERING DEVICE OF AN EXHAUST GAS EMISSION CONTROL SYSTEM AND DEVICE TO IMPLEMENT THE PROCEDURE

(75) Inventors: Wolfram Veigel, Hessigheim (DE); Stefan Motz, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 827 days.

(21) Appl. No.: 11/716,814

(22) Filed: Mar. 12, 2007

(65) Prior Publication Data

US 2007/0261481 A1 Nov. 15, 2007

(30) Foreign Application Priority Data

Apr. 7, 2006 (DE) ................. 10 2006 016 447

(51) Int. Cl.
*F01N 3/00* (2006.01)
*F01N 3/10* (2006.01)

(52) U.S. Cl. ............... 60/286; 60/274; 60/295; 60/303

(58) Field of Classification Search ........... 60/274, 60/286, 295, 303
See application file for complete search history.

(56) References Cited

U.S. PATENT DOCUMENTS

2007/0068525 A1\* 3/2007 Offenhuber et al. .... 128/204.21

2009/0255232 A1\* 10/2009 Barcin .................. 60/274

FOREIGN PATENT DOCUMENTS

| DE | 100 56 016 A1 | 5/2002 |
| DE | 101 59 849 A1 | 6/2003 |
| DE | 10 2004 061 247 A1 | 6/2006 |
| WO | WO 2005045209 A1 \* | 5/2005 |
| WO | WO 2006074833 A1 \* | 7/2006 |

\* cited by examiner

*Primary Examiner*—Thomas E Denion
*Assistant Examiner*—Audrey Klasterka
(74) *Attorney, Agent, or Firm*—Merchant & Gould P.C.

(57) ABSTRACT

A procedure to operate a metering device of an exhaust gas emission control system of an internal combustion engine and a device to implement the procedure are proposed. At least one component in an exhaust gas emission control configuration of the exhaust gas emission control system requires at least in certain operating conditions a reagent substance, which the metering device provides, in which a connecting line is disposed. After the emergence of a metering demand signal a reagent substance rate-set point is established. The reagent substance rate-set point is either established immediately when the metering demand signal occurs and subsequently no longer changed until the connecting line is filled with the reagent substance; or the reagent substance rate-set point is only then established if the connecting line is filled with the reagent substance. An overdose of the reagent substance is avoided with the procedural approach according to the invention.

11 Claims, 1 Drawing Sheet

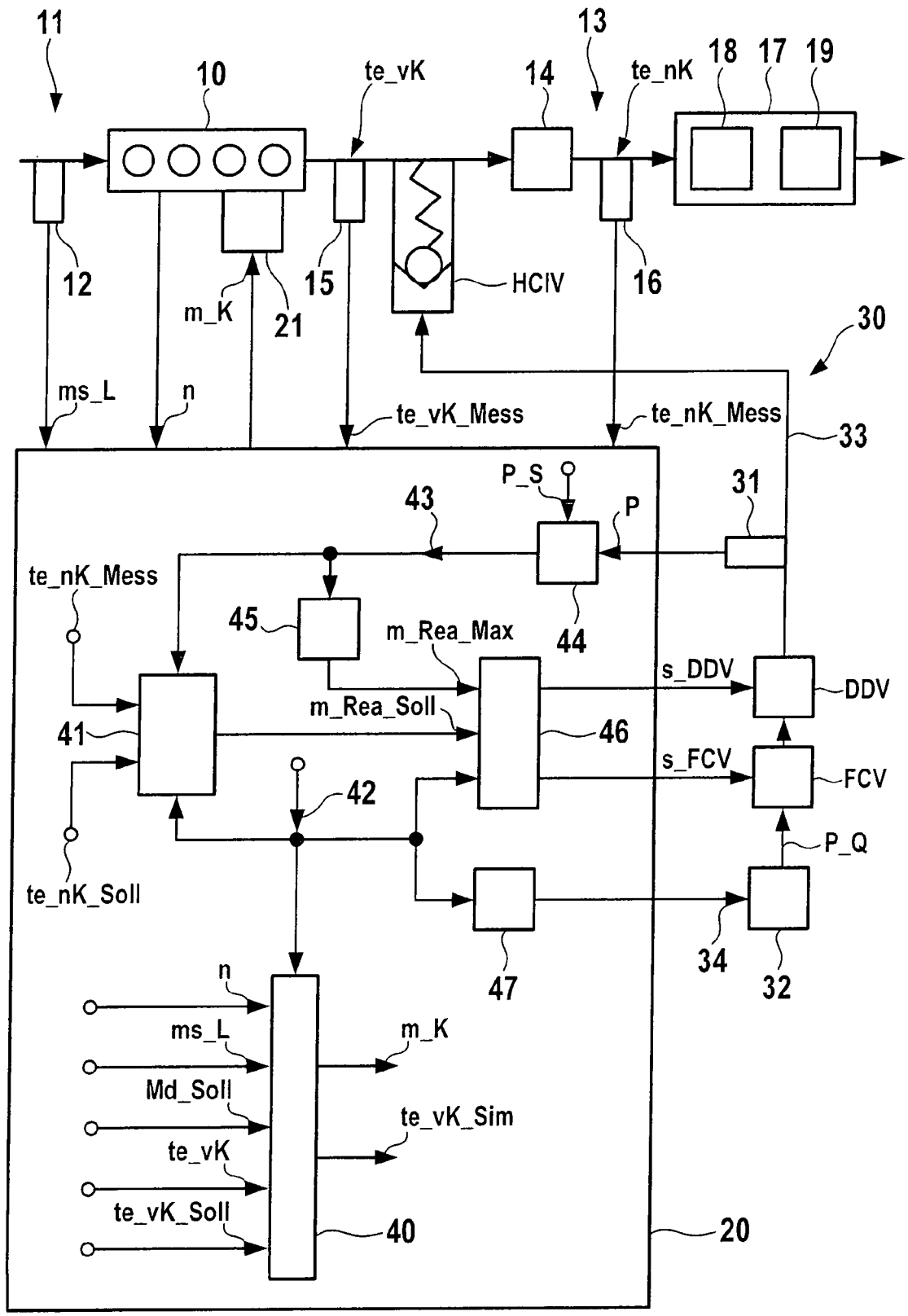

PROCEDURE TO OPERATE A METERING DEVICE OF AN EXHAUST GAS EMISSION CONTROL SYSTEM AND DEVICE TO IMPLEMENT THE PROCEDURE

BACKGROUND OF THE INVENTION

The invention proceeds from a procedure to operate a metering device of an exhaust gas emission control system and from a device to implement the procedure according to the class of the independent claims.

The subject matter of the invention at hand is also a computer program as well as a computer program product.

In the German patent DE 100 56 016 A1, a procedure is described, in which a regeneration is introduced as a function of a parameter of a particle filter disposed in the exhaust gas area of an internal combustion engine. The particle filter is a component of the exhaust gas emission control system. The temperature of the particle filter during the regeneration depends on the one hand on the condition of the particle filter and on the other hand on the operating condition of the internal combustion engine. The increase of temperature of the exhaust gas is, for example, implemented by the introduction of non-combusted fuel into the exhaust gas area of the internal combustion engine, which reacts exothermally on a catalytically active surface with the residual oxygen contained in the exhaust gas. The heated exhaust gases heat up the catalytically active surface as well as especially the components of the exhaust gas emission control system, which are disposed downstream behind the catalytically active surface.

In the German patent DE 101 59 849 A1, a procedure and device are described, in which a reagent substance under pressure is sprayed into the exhaust gas of an internal combustion engine in front of the SCR catalytic converter. Provision is made for fuel to be to reagent substance, which acts especially as a reducing agent for the NO2 proportion of the exhaust gas.

In the German patent DE 10 20 04 061 247 A1 (unpublished), a procedure and device are described, in which a reagent substance under pressure is sprayed into the exhaust gas of an internal combustion engine in front of an exhaust gas emission control system. Provision is also made in this case for fuel to be the reagent substance, which reacts exothermally on a catalytically active surface with the residual oxygen present in the exhaust gas. The heated exhaust gas stream heats the components disposed downstream behind the catalytically active surface. The metering device for the reagent substance contains a switchable safety relief valve, a continuous metering valve and a reagent substance introduction valve designed as a check valve. The reagent substance introduction valve sprays the fuel into the exhaust gas area. Provision is made for a pressure sensor, which acquires the pressure of the reagent substance in the metering device.

In exhaust gas emission control systems of this kind, significant importance is attributed to the correct manner of operation of the metering device. In the case of an underdose of the reagent substance, the danger exists that a reagent substance slippage occurs and/or that a catalytic converter/particle filter is damaged. Provided that provision is made for fuel to be the reagent substance; in the case of an overdose of fuel, which is supposed to react exothermally with oxygen in the exhaust gas area, a very quick increase to an inadmissibly high temperature must be anticipated, by which exhaust gas components as well as the exhaust gas emission control system can be damaged. Should the situation of inadmissibly high temperatures arise, a significant fire danger can arise in the worst case scenario.

SUMMARY OF THE INVENTION

The procedural approach according to the invention with the characteristics of the independent procedural claims has on the other hand the advantage that an overdose of the reagent substance, for example fuel, is avoided. Particularly after an extended operational stoppage of a metering device of an exhaust gas emission system, an overdose of the reagent substance is avoided.

The starting point is a metering device, in which the reagent substance is carried in a connecting line to a reagent substance introduction valve, which sprays the reagent substance into the exhaust gas area.

During an operational stoppage of the metering device, the connecting line can drain empty due to a leakage in the metering device. Provided that the reagent substance introduction valve is implemented as a check valve; during an operational stoppage of the metering device, the pressure of the reagent substance in the connecting line can exceed the opening pressure of the check valve due to a temperature increase of the reagent substance introduction valve, which is exposed to the exhaust gas temperature. As a result an undesirable metering of the reagent substance occurs, which likewise leads to the connecting line draining empty.

During a subsequent startup of the metering device without the procedural step provided for according to the invention, an overdose of the reagent substance can thereby occur, so that, for example, a temperature regulator and/or a regulator for the reagent substance rate demands a greater amount of the reagent substance than is necessary on account of the initially absent dose due to the connecting line being drained empty.

The overdose of the reagent substance, which occurs should such an occasion arise, can be avoided by waiting until the connecting line is filled with the reagent substance. Before the connecting line is not filled with the reagent substance, an already established reagent substance rate-set point is not changed. Provision can be equally made to first establish the reagent substance rate-set point, when the connecting line is filled. With the step provided for according to the invention, the metering of the correct amount of the substance to be metered is assured after the filling of the connecting line, so that an overdose of the reagent substance is avoided.

Provided that provision is made for the reagent substance to undergo an increase in temperature, the procedural approach according to the invention avoids an inadmissibly high temperature in the exhaust gas area, which could lead to a damaging of the exhaust gas structural members and/or components of an exhaust gas emission control system or to a fire danger.

Provided that provision is made for the reagent substance to implement the purification function of a catalytic converter, the procedural approach according to the invention avoids on the one hand damage to the catalytic converter and on the other hand a reagent substance slippage should the occasion arise.

Advantageous modifications and embodiments of the procedural approach according to the invention result from the dependent claims.

Provision is made in an advantageous embodiment, which assumes a filled connecting line, if the reagent substance pressure occurring in the connecting line has a specified set point pressure. Provided that the reagent substance introduction valve is designed as a check valve, provision is made in a modification to have the set point pressure at least approximately correspond to the opening pressure of the check valve.

Provision is made in another embodiment to have a metering valve disposed in the metering device to be completely open when the connecting line is not completely filled. In so doing, the connecting line is filled as quickly as possible with the reagent substance.

Provision is made in an embodiment for the reagent substance rate-set point to be established as a function of the exhaust gas temperature upstream in front of a catalytically active surface and downstream behind a catalytically active surface. In so doing, the exhaust gas temperature of the internal combustion engine, which contributes to the temperature increase, is taken into account during the establishment of the reagent substance rate-set point.

Provision is made in an embodiment for the reagent substance rate-set point to be established as a function of the exhaust gas temperature downstream behind the catalytically active surface and as a function of a specified exhaust gas set point temperature for the exhaust gas temperature downstream behind the catalytically active surface. With this step, especially a closed-loop control of the exhaust gas temperature, respectively the reagent substance rate-set point, can be performed. The inclusion of either the exhaust gas temperature or the amount of the reagent substance into a closed-loop control feedback concept allows for a rapid achievement of a specified set point temperature of either the exhaust gas or at least of a component of the exhaust gas emission control system and avoids at the same time an inadmissibly high temperature.

Provision can be made for a fuel afterinjection into the internal combustion engine to regulate the exhaust temperature upstream in front of the exhaust gas emission control system. This leads to an increase in the exhaust gas temperature due to a degradation of the degree of efficiency of the internal combustion engine. The fuel afterinjection is preferably implemented as a fuel afterinjection adsorbed by the main combustion, in which only a slight portion is converted into mechanical driving power.

The device according to the invention to implement the procedure concerns a control unit, which is specially designed to implement the procedure.

The control unit contains preferably at least one electrical storage unit, in which the procedural steps are deposited as a computer program.

Provision is made in the computer program according to the invention for all steps of the procedure according to the invention to be executed, when it is run on a computer.

The computer program product according to the invention with a program code stored on a machine-readable carrier executes the procedure according to the invention, if the program is executed on a computer or in a control unit.

BRIEF DESCRIPTION OF THE DRAWING

FIG. 1 shows an internal combustion engine.

DETAILED DESCRIPTION

Additional advantageous modifications and embodiments of the procedural approach according to the invention result from the additional dependent claims. Examples of embodiment of the invention are depicted in the drawing and are explained in detail in the following description.

The FIGURE shows an internal combustion engine 10, in whose air intake area 11 an air sensor 12 is disposed; and in whose exhaust gas area 13 upstream in front of an oxidation catalytic converter 14, a first temperature sensor 15 and a reagent substance introduction valve HCIV are disposed; and downstream behind the oxidation catalytic converter 14, a second temperature sensor 16 as well as an exhaust gas emission control system 17 is disposed. The emission control system 17 contains a catalytic converter 18 as well as a particle filter 19.

In the exhaust gas area 13 upstream in front of the oxidation catalytic converter 14, an exhaust gas temperature te_vK occurs, and downstream behind the oxidation catalytic converter 14 an exhaust gas temperature te_nK occurs.

The air sensor 12 provides an air signal ms_L to a control unit 20; the internal combustion engine 10 a rotational speed n, the first temperature sensor 15 a first temperature measurement signal te_vK_Mess and the second temperature sensor 16 a second temperature measurement signal te_nK_Mess. The control unit 20 provides a fuel signal m_K to a fuel metering 21.

The reagent substance introduction valve HCIV is a part of a metering device 30, which contains additionally a pressure sensor 31, a metering valve DDV, a safety relief valve FCV as well as a pump 32. The pressure sensor 31 is disposed in a connecting line 33 between the metering valve DDV and the reagent substance introduction valve HCIV. The pump 32 supplies a reagent substance with a source pressure P_Q.

The pressure sensor 31 provides the control unit 20 with a pressure measurement signal p. The control unit 20 provides the metering valve DDV with a metering valve activation signal s_DDV, the safety relief valve FCV with a safety relief valve activation signal S_FCV as well as the pump 32 with a pump activation signal 34.

The control unit 20 contains a fuel signal and temperature ascertainment 40, which is provided with the engine rotational speed n, the air signal ms_L, a torque set point Md_Soll, the first temperature measurement signal te_vK_Mess as well as a first temperature set point te_vK_Soll and which provides the fuel signal m_K as well as a calculated temperature signal te_vK_Sim.

The control unit 20 contains additionally a reagent substance rate-establishment 41, which is provided with the second temperature signal te_nK_Mess, a second temperature set point te_nK_Soll, a metering demand signal 42 as well as an enabling signal 43, and which provides a reagent substance rate-set point m_Rea_Soll.

The enabling signal 43 is provided by a comparator, which compares the pressure measurement signal p with a pressure threshold value P_S. The enabling signal 43 is additionally provided to a converter 45, which provides a reagent substance rate-maximum value m_Rea_Max.

The reagent substance rate-maximum value m_Rea_Max, the reagent substance rate-set point m_Rea_Soll as well as the metering demand signal 42 are provided to a valve activation 46, which supplies the metering valve activation signal s_DDV as well as the safety relief valve activation signal s_FCV. The metering demand signal 42 is additionally provided to a pump activation 47, which supplies the pump activation signal 34.

The procedure works in the following manner:

The exhaust gas of the internal combustion engine 10 contains undesirable components, as, for example, nitrogen oxides and particles. The exhaust gas emission control system 17 has the task of removing the undesirable exhaust gas components as much as possible. The exhaust gas emission control system 17 contains preferably the catalytic converter 18, which, for example, is designed as an oxidation catalytic converter, three-way-catalytic converter and/or as a $NO_x$-catalytic converter, and/or contains the particle filter 19.

The exhaust gas emission control system 17 or at least parts 18, 19 of the exhaust gas emission control system 17 can require in certain operating conditions a minimum temperature. For example, a reaction at a catalytically active surface area proceeds optimally within a certain temperature window. Additionally a minimum temperature can be required, in order to be able to implement a regeneration especially of a particle filter 19. For example, a particle filter 19 requires a starting temperature, which can lie between 450-650° C. as a function of the conditioning of the particles, to initiate the particle burnout. A $NO_X$-storage catalytic converter 18 requires an elevated temperature during the regeneration. Especially for the regeneration of a sulfur contamination, significantly elevated temperatures up to 800° C. are required.

For the temperature elevation of at least a part of the exhaust gas emission control system 17, the exhaust gas temperature te_nK, occurring in the exhaust gas area 13 upstream in front of the exhaust gas emission control system 17 can, for example, be used. For additional temperature elevation of the exhaust gas, a reagent substance can be introduced into the exhaust gas area 13, which reacts exothermally on a catalytically active surface with the residual oxygen contained in the exhaust gas.

The catalytically active surface can according to the example of embodiment shown be provided by the oxidation catalytic converter 14. Provision is made in the example of embodiment shown for the oxidation catalytic converter 14 to be a separate exhaust gas component upstream in front of the exhaust gas emission control system 17. According to an unspecified embodiment, the catalytically active surface can be contained in the exhaust gas emission control system 17. For example, the catalytic converter 18 can fulfill the task of the oxidation catalytic converter 14. Provision can additionally be made for the particle filter 19 of the exhaust gas emission control system 17 at least partially to contain a catalytically active coating, which acts as the oxidation catalytic converter, so that provision must not be made for an independent component acting at least as an oxidation catalytic converter in the entire exhaust gas area 13. Hence, all catalytically active surfaces are denoted below with the reference number 14.

At least a $NO_X$-storage catalytic converter 18 and/or the particle filter 19 can require a reagent substance to support and/or to implement the exhaust gas emission control function. For example, a $NO_X$-storage catalytic converter requires an oxygen lean exhaust gas to implement the regeneration. Provided that the catalytic converter 18 is implemented as a SCR-catalytic converter, a reagent substance is likewise required, for example ammonia.

The reagent substance introduction valve HCIV provided to introduce the reagent substance into the exhaust gas area 13 is disposed upstream in front of the catalytically active surface 14. In regard to the reagent substance, we are concerned especially with fuel, which during oxidation can lead in a short time to a high temperature elevation. Furthermore, fuel as a reagent substance can supply oxygen lean exhaust gas for the regeneration of a catalytic converter.

The reagent substance is brought by the pump 32 to a specified source pressure P_Q. For safety reasons provision is made for the safety relief valve FCV to be either completely opened or closed by the safety relief valve activation signal s_FCV.

The flow rate of the reagent substance can be set in the example of embodiment shown with the metering valve DDV disposed downstream behind the safety relief valve FCV. The metering valve DDV is activated by the metering valve activation signal s_DDV. The metering valve has preferably a continuous (stepless) adjustment, whereby preferably provision is made for a clocked operation, in which the metering valve DDV is supplied with breaker signals in quick, chronological succession.

The reagent substance introduction valve provided to introduce the reagent substance into the exhaust gas area 13 is, for example, implemented as a check valve HCIV, which has an opening pressure P_HCIV.

The pressure sensor 31 acquires the pressure of the reagent substance occurring in the connecting line 33. The pressure sensor 31 provides the control unit 20 with the pressure measurement signal p, which is at least a measurement for the reagent substance pressure in the connecting line 33.

Due to leakages in the metering device 30, a pressure drop in the connecting line 33 can occur especially during an operational stoppage even when the metering valve DDV is closed and the reagent substance introduction valve HCIV is closed. A pressure drop especially occurs, if the reagent substance introduction valve HCIV is implemented as a check valve, which is exposed to hot exhaust gases. As a result of the increase in temperature in the connecting line 33, the opening pressure P_HCIV of the check valve HCIV can be exceeded, so that an undesirable dose of the reagent substance occurs with the consequence that the pressure of the reagent substance in the connecting line 33 drops after a subsequent cooling down or that the connecting line has drained empty.

For the case of a metering demand signal 42 occurring, which signals a desired temperature elevation either of the catalytic converter 18 and/or the particle filter 19, provision can be made to initially increase the exhaust gas temperature te_vK of the internal combustion engine 10 upstream in front of the catalytically active surface 14 by means of steps within the engine.

The fuel signal-temperature-ascertainment 40 establishes the fuel signal m_K as a function, for example, of the engine rotational speed n, of the air signal ms_L and/or as a function of the torque set point Md_Soll. In so doing, when a metering demand signal 42 occurs, the fuel signal m_K can be established in such a manner that the exhaust gas temperature te_vK upstream in front of the catalytically active surface 14 achieves the specified first temperature set point te_vK_Soll, which, for example, lies at 500° C.

The elevation of the exhaust gas temperature te_vK of the internal combustion engine 10 can, for example, be accomplished by means of a degradation of the degree of efficiency of the internal combustion engine 10. For example, provision is made for a fuel afterinjection into the internal combustion engine 10. The fuel afterinjection can, for example, be implemented as an adsorbed fuel afterinjection, during which only a slight portion is converted into mechanical driving power, so that the degree of efficiency degrades.

The fuel signal-temperature-establishment 40 can ascertain the calculated exhaust gas temperature te_vK_Sim using an assortment or the available input parameters, which is supplied to an unspecified exhaust gas temperature regulator. Alternatively or additionally the exhaust gas temperature te_vK upstream in front of the catalytically active surface 14 can be acquired with the first temperature sensor 15, which provides the first temperature measurement signal te_vK_Mess to the control unit 20.

Based on the exhaust gas temperature te_vK upstream in front of the catalytically active surface 14, 18, an additional temperature elevation caused by the oxidation of the reagent substance on the catalytically active surface 14 is achieved with the metering of the reagent substance, for example fuel. The specified second exhaust gas set point temperature te_nK_Soll, which is supposed to occur downstream behind the catalytically active surface 14, is provided to the reagent substance rate-establishment 41.

The reagent substance rate-establishment 41, which provides the reagent substance rate-set point m_Rea_Soll, contains preferably a temperature regulator. The reagent substance rate-establishment 41 ascertains the reagent substance rate-set point m_Rea_Soll and supplies the reagent substance rate-set point as a control variable. The reagent substance rate-set point m_Rea_Soll is established by the reagent substance rate-establishment 41 according to an example of embodiment using the exhaust gas temperature te_vK of the internal combustion engine 10 upstream in front of the catalytically active surface 14, 18 and using the exhaust gas temperature te_nK downstream behind the catalytically active surface 14, 18. Alternatively or additionally the reagent substance rate-establishment 41 establishes the reagent substance rate-set point m_Rea_Soll using the temperature difference between the exhaust gas temperature te_nK downstream behind the catalytically active surface 14 and the second temperature set point te_nK_Soll. Simultaneously with the provision of the reagent substance rate-set point m_Rea_Soll, the pump activation 47 is activated with the metering demand signal 42, which provides the pump activation signal 34, which causes the pump 32 to supply the reagent substance with the specified source pressure P_Q.

If the connecting line is not filled with the reagent substance, the reagent substance rate-establishment 41 determines no increase in the second temperature measurement signal te_nK_Mess, although a metering should actually take place. Sequentially the reagent substance rate-establishment 41 will increase the reagent substance rate-set point m_Rea_Soll without the step provided according to the invention. If a metering is subsequently deployed, an overdose of the reagent substance must be anticipated, which can lead to an inadmissibly high temperature increase in the exhaust gas area 13 downstream behind the catalytically active surface 14.

Provision is made according to the invention initially to wait after the metering demand signal 42 occurs until the connecting line 33 is filled with the reagent substance. In so doing, the reagent substance rate-establishment 41 can immediately establish the reagent substance rate-set point m_Rea_Soll, which then, however, is no longer changed until the connecting line 33 is filled and the metering begins. Alternatively the reagent substance rate-establishment 41 can only then establish the reagent substance rate-set point m_Rea_Soll, if the connecting line 33 is filled with the reagent substance.

The ascertainment, if the connecting line 33 is filled with the reagent substance, can happen in different ways. For example, provision can be made for a test with acoustic signals. In the example of embodiment shown, the ascertainment occurs using the pressure of the reagent substance present in the connecting line 33, which is acquired by the pressure sensor 31.

The comparator 44 compares the pressure measurement signal p provided by the pressure sensor with the pressure threshold value P_S. Provided that the reagent substance introduction valve HCIV is implemented as a check valve, the pressure threshold value P_S is preferably at least approximately established to the opening pressure P_HCIV of the check valve HCIV. In this connection, especially the threshold value P_S can approximately be established at a specified measurement beneath the opening pressure P_HCIV of the check valve HCIV.

As long as the pressure measurement signal p lies beneath the pressure threshold value P_S, the comparator 44 does not provide the enabling signal 43. If the metering demand signal 42 is simultaneously present, the reagent substance rate-establishment 41 can according to a first embodiment immediately establish the reagent substance rate-set point m_Rea_Soll, whereby, however, the reagent substance rate-set point is no longer changed until the enabling signal 43 occurs. Provision can be made according to another embodiment for the reagent substance rate-establishment 41 to establish the reagent substance rate-set point m_Rea_Soll only then if the enabling signal 43 occurs.

Provision is made according to an advantageous embodiment to have the metering valve DDV completely open when the enabling signal 43 is absent. This allows the connecting line 33 to be filled as quickly as possible. When the enabling signal 43 is absent, the converter 45 supplies the reagent substance rate-maximum value m_Rea_Max, which causes the valve activation 46 to generate the maximum possible metering valve activation signal s_DDV. The provision of the reagent substance rate-maximum value m_Rea_Max is taken back, if the enabling signal 43 occurs.

After the enabling signal 43 occurs, the normal metering of the reagent substance takes place.

The invention claimed is:

1. A method of operating a metering device of an exhaust gas emission control system of an internal combustion engine, in which a reagent substance supplied by the metering device is carried via a connecting line, the method comprising:

establishing a reagent substance rate-set point after an emergence of a metering demand signal and subsequently not changing the reagent substance rate set point until the connecting line is filled with the reagent substance, or when the connecting line is filled with the reagent substance.

2. A method according to claim 1, further comprising detecting if the connecting line is filled with the reagent substance using a pressure occurring in the connecting line.

3. A method according to claim 2, wherein detecting includes using a pressure threshold value corresponding to an opening pressure of a reagent substance introduction valve, which introduces the reagent substance into an exhaust gas area.

4. A method according to claim 1, wherein a metering valve disposed in the metering device is completely open until the connecting line is filled with the reagent substance.

5. A method according to claim 1, wherein establishing includes establishing the reagent substance rate-set point as a function of an exhaust gas temperature upstream of a catalytically active surface and as a function of an exhaust gas temperature downstream of the catalytically active surface.

6. A method according to claim 1, wherein establishing includes establishing the reagent substance rate-set point as a function of an exhaust gas temperature downstream a catalytically active surface and as a function of a temperature set point for the exhaust gas temperature downstream of the catalytically active surface.

7. A method according to claim 5, further comprising adjusting an exhaust gas temperature upstream of the catalytically active surface using a fuel afterinjection in the internal combustion engine.

8. A method according to claim 1, wherein establishing includes establishing the reagent substance rate-set point within a scope of a temperature closed loop control.

9. A method according to claim 1, wherein establishing includes establishing the reagent substance rate-set point at a point specified within the scope of a flow rate control.

10. A device to operate a metering device of an exhaust gas emission control system of an internal combustion engine in which a reagent substance supplied by the metering device is carried via a connecting line, the device comprising at least one control unit that establishes a reagent substance rate-set point after an emergence of a metering demand signal and subsequently not changing the reagent substance rate set point until the connecting line is filled with the reagent substance, or when the connecting line is filled with the reagent substance.

11. A computer program product with a program code stored on a non-transitory machine-readable carrier to implement a method for operating a metering device of an exhaust gas emission control system of an internal combustion engine, in which a reagent substance supplied by the metering device is carried via a connecting line, the computer program product including instructions executable on a computing device that establish a reagent substance rate-set point after an emergence of a metering demand signal and subsequently not changing the reagent substance rate set point until the connecting line is filled with the reagent substance, or when the connecting line is filled with the reagent substance.

* * * * *